(12) United States Patent
Rappaport et al.

(10) Patent No.: US 10,263,763 B2
(45) Date of Patent: Apr. 16, 2019

(54) SYSTEMS, METHODS, AND COMPUTER-ACCESSIBLE MEDIA FOR MEASURING OR MODELING A WIDEBAND, MILLIMETER-WAVE CHANNEL AND METHODS AND SYSTEMS FOR CALIBRATING SAME

(71) Applicant: NEW YORK UNIVERSITY, New York, NY (US)

(72) Inventors: Theodore Rappaport, Riner, VA (US); George R. MacCartney, Aston, PA (US)

(73) Assignee: New York University, New York, NY (US)

(*) Notice: Subject to any disclaimer, the term of this patent is extended or adjusted under 35 U.S.C. 154(b) by 0 days.

(21) Appl. No.: 15/553,781

(22) PCT Filed: Feb. 26, 2016

(86) PCT No.: PCT/US2016/019859
§ 371 (c)(1),
(2) Date: Aug. 25, 2017

(87) PCT Pub. No.: WO2016/138430
PCT Pub. Date: Sep. 1, 2016

(65) Prior Publication Data
US 2018/0054294 A1 Feb. 22, 2018

Related U.S. Application Data

(60) Provisional application No. 62/121,124, filed on Feb. 26, 2015.

(51) Int. Cl.
*H04B 17/00* (2015.01)
*H04L 7/00* (2006.01)
(Continued)

(52) U.S. Cl.
CPC ............ *H04L 7/0033* (2013.01); *H04B 7/24* (2013.01); *H04B 10/90* (2013.01); *H04B 17/104* (2015.01);
(Continued)

(58) Field of Classification Search
CPC ............ H04B 17/0042; H04B 17/0047; H04B 17/0062; H04B 17/0075; H04B 17/008; H04W 24/00
See application file for complete search history.

(56) References Cited

U.S. PATENT DOCUMENTS 6,404,535 B1 6/2002 Leight
6,603,810 B1 8/2003 Bednekoff et al.
(Continued)

OTHER PUBLICATIONS

Rappaport, Theodore S. et al., "Millimeter Wave Mobile Communications for 5G Cellular: It Will Work!," IEEE, vol. 1, pp. 335-349, 2013.
(Continued)

*Primary Examiner* — Tuan Pham
(74) *Attorney, Agent, or Firm* — Hunton Andrews Kurth LLP

(57) ABSTRACT

Exemplary systems and methods can be provided for measuring a parameter—e.g., channel impulse response and/or power delay profile—of a wideband, millimeter-wave (mmW) channel. The exemplary systems can include a receiver configured to receive a first signal from the channel, generate a second signal, and measure the parameter based on a comparison between the first and second signals; and a controller configured to determine first and second calibration of the system before and after measuring the parameter, and determine a correction for the parameter measurement based on the first and second calibrations. Exemplary methods can also be provided for calibrating a system for measuring the channel parameter. Such methods can be utilized for systems in which the TX and RX devices share a common frequency source and for systems in which the TX and RX devices have individual frequency sources that free-run during channel measurements.

15 Claims, 13 Drawing Sheets

(51) Int. Cl.

| | | |
|---|---|---|
| *H04B 7/24* | (2006.01) | |
| *H04B 17/11* | (2015.01) | |
| *H04B 17/21* | (2015.01) | |
| *H04B 17/10* | (2015.01) | |
| *H04B 17/309* | (2015.01) | |
| *H04B 17/364* | (2015.01) | |
| *H04W 56/00* | (2009.01) | |
| *H04B 10/90* | (2013.01) | |
| *H04B 10/00* | (2013.01) | |

(52) U.S. Cl.
CPC .............. *H04B 17/11* (2015.01); *H04B 17/21* (2015.01); *H04B 17/309* (2015.01); *H04B 17/364* (2015.01); *H04L 7/0066* (2013.01); *H04W 56/0055* (2013.01); *H04B 10/00* (2013.01)

(56) References Cited

U.S. PATENT DOCUMENTS

| | | | | |
|---|---|---|---|---|
| 8,355,473 | B2* | 1/2013 | Li | H04L 27/266 342/357.63 |
| 8,611,401 | B2 | 12/2013 | Lakkis | |
| 2002/0165002 | A1 | 11/2002 | Kolinko et al. | |
| 2002/0187769 | A1 | 12/2002 | Johnson et al. | |
| 2013/0315321 | A1 | 11/2013 | Rajagopal et al. | |
| 2014/0018004 | A1 | 1/2014 | Li et al. | |
| 2014/0162568 | A1 | 6/2014 | Laskar | |
| 2014/0328433 | A1 | 11/2014 | Loh et al. | |
| 2016/0149652 | A1* | 5/2016 | Huang | H04B 17/14 375/221 |
| 2018/0042045 | A1* | 2/2018 | Choi | H04W 16/14 |

OTHER PUBLICATIONS

Rappaport, Theodore S. et al., "Millimeter Wave Wireless Communications," IEEE Wireless Communications, pp. 6-7, Oct. 2015.

Sun, Shu et al., "MIMO for Millimeter-Wave Wireless Communications: Beamforming, Spatial Multiplexing, or Both?," IEEE Communication Magazine, pp. 110-121, Dec. 2014.

Nie, Shuai et al., "71 GHz Millimeter Wave Indoor Measurements for Wireless and Backhaul Communications," IEEE, pp. 2429-2433, 2013.

Rappaport, Theodore S. et al., "Wireless Communications, Principles and Practice," Second Edition, Pearson, 1996.

International Search Report dated Jun. 30, 2016 for International Application No. PCT/US2016/019859.

International Written Opinion dated Jun. 30, 2016 for International Application No. PCT/US2016/019859.

* cited by examiner

SYSTEMS, METHODS, AND COMPUTER-ACCESSIBLE MEDIA FOR MEASURING OR MODELING A WIDEBAND, MILLIMETER-WAVE CHANNEL AND METHODS AND SYSTEMS FOR CALIBRATING SAME

CROSS-REFERENCE TO RELATED APPLICATION(S)

This application is based upon and claims the benefit of priority from U.S. Patent Application Ser. No. 62/121,124, filed on Feb. 26, 2015, the entire disclosure of which is incorporated herein by reference.

FIELD OF THE DISCLOSURE

The present application relates generally to the field of wireless communication systems, and more specifically to systems and method for measuring, modeling, and emulating electromagnetic channels and radio frequency (RF) transmit and receive circuitry that can improve the efficiency of testing electromagnetic channels eliminate the need for multiple cables, and facilitate further RF front-end designs to be easily built.

BACKGROUND INFORMATION

The wireless industry is en-route to another revolution with the advancement of millimeter-wave technologies and the explosion of every day electronic devices connected to the Internet in the new age of the Internet-of-Things (IoT). Since the publication of "Millimeter Wave Mobile Communications for 5G Cellular: It will Work" in May 2013 in IEEE ACCESS, there has been worldwide interest in using millimeter wave (mmW) wireless spectrum for future mobile and portable communications. An expanding use of wirelessly connected devices has created a spectrum and capacity crunch that has led industry and academia to search for near-term solutions and technologies. Millimeter wave (mmW) frequencies between 30 and 300 GHz (and actually below 10 GHz, as well, including bands such as 28, 37-39, 57-63, 64-71, 71-76, and 81-86 GHz, have been attracting growing attention as a possible candidate for next-generation microcellular networks due to the availability of unused spectrum. These higher frequencies provide much wider bandwidths than current cellular and their feasibility has more or less been proven as a viable solution for mobile, backhaul, and indoor wireless communications through recent research. Furthermore, the Federal Communications Commission (FCC) in the United States has put forth a petition to investigate and consider the use of frequencies above 24 GHz for future wireless networks (FCC Proceeding 14-177). Exemplary embodiments of such mmW systems can be based on orthogonal frequency division multiplexing (OFDM) technology that is known to persons skilled in the art. More background information concerning mmW technology can be found in T. Rapaport, et al., MILLIMETER WAVE WIRELESS COMMUNICATIONS (Prentice-Hall 2014).

However, currently available mmW devices principally use highly directional horn antennas to enable short-range, line-of-sight links, within a controlled and immobile environment, such as a point to point link between buildings or in or between a data center. Since such an ideal environment and line of sight conditions are very difficult—if not impossible—to replicate in a practical system implementation where mobile users are involved, there is a need for building mmW systems "in the wild," e.g., where line-of-sight is not always available, SNRs are lower, and where mobility is the norm, so the use of static directional antennas is infeasible.

Accordingly, mmW systems and devices are likely to utilize a variety of multi-antenna technology (e.g., antenna arrays) at the transmitter, the receiver, or both. Currently, arrays used in base stations and mobile stations for transmission and/or reception of cellular-band (e.g., 1-2 GHz) signals are limited to a few elements, e.g., two to six. However, the small wavelengths of the mmW bands, combined with advances in radio-frequency (RF) electronics, have facilitated mmW arrays containing a large number of antenna elements to be fabricated at costs suitable for large-volume consumer devices. Certain exemplary mmW array designs envision 16 to 64 antenna elements in both a fixed device (e.g., access point or base station) and in a mobile or portable device (e.g., smartphone or tablet). Such an exemplary design is described in S. Shu, et al., "MIMO for Millimeter-wave Wireless Communications: Beamforming, Spatial Multiplexing, or Both?", IEEE COMM'NS MAG. 110-21, December 2014.

Multi-antenna technology can be used to improve various aspects of a communication system, including system capacity (e.g., more users per unit bandwidth per unit area), coverage (e.g., larger area for given bandwidth and number of users), and increased per-user data rate (e.g., for a given bandwidth and area). Directional communications using multiple antenna can also ensure better wireless links as a mobile or fixed devices experience a time-varying channel.

For example, multiple antennas at the transmitter and/or the receiver can be used to shape or "form" the overall antenna beam (e.g., transmit and/or receive beam, respectively) in a particular way, with the general goal being to improve the received signal-to-interference-plus-noise ratio (SINR) and, ultimately, system capacity and/or coverage. This can be accomplished, for example, by maximizing the overall antenna gain in the direction of the target receiver or transmitter or by suppressing specific dominant interfering signals, or by using a few different beams that contain significant energy. In general, beamforming can increase the signal strength at the receiver in proportion to the number of transmit antennas, and may also null out or minimize interference. Beamforming can be based either on high or low fading correlation between the antennas. High mutual antenna correlation can typically result from a small distance between antennas in an array. In such exemplary conditions, beamforming can boost the received signal strength but does not provide any protection against radio-channel fading, because such an arrangement does not provide diversity. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

By way of a further example, multiple antennas at both the transmitter and the receiver can improve the SINR and/or achieve additional diversity/protection against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such exemplary cases, using multiple antennas at both the transmitter and receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

One challenge in designing and building such multi-antenna devices and systems can be that they must be thoroughly tested for reliability, functionality, and/or performance during development (e.g., in a design and/or qualification laboratory) and/or manufacturing. For example, testing wireless devices can be challenging due to the unique characteristics and vagaries of the wireless channel. A channel emulator is a device that re-creates a physical channel between the TX and RX devices for different geographical conditions, under various multipath, mobility, weather, and fading scenarios. It can be a staple part of any laboratory or factory where wireless devices are designed and/or tested. Typically, the TX and RX devices under test (DUTs) are connected to the channel emulator using cables that carry the RF signals. The wireless devices can then be tested based on the emulated wireless channel.

To be useful in this manner, however, channel emulators can require accurate models of each physical channel to be applied to the DUTs. Existing models for lower-band channels used in 3G and 4G/LTE systems were created in part by measurements contributed to the Third-Generation Partnership Project (3GPP) and WINNER-II initiative. Such models can be constructed from channel measurements made using channel measurement devices and/or systems known as channel sounders. One objective of a channel sounder is to accurately capture one or more parameters of the channel, including but not limited to a complex channel impulse response (CIR) and a power delay profile (PDP). Such parameters generally represent the time delay behavior of the wireless channel between a transmitter and receiver, together with accurate measures of power decay and multipath characteristics as a function of time delay.

As described in T. Rappaport, WIRELESS COMMUNICATIONS: PRINCIPLES AND PRACTICES (2d ed., 2002), a power delay profile is a practical measure of the time delays based on a finite bandwidth probe transmitted by the channel sounder transmitter where the power of the multipath channel is determined over time delay. Moreover, the square root of a PDP can contain phase information for individual multipath components and, therefore, can be a surrogate for the complex CIR. As used herein, both CIR and PDP can—but do not necessarily—include phase information as well as angular/spatial direction and other channel characteristics known to those skilled in the art.

While existing channel sounders may have been adequate for lower-band channels with smaller bandwidths, they are lacking in the flexibility, measurement bandwidth, and processing capacity necessary to properly measure and construct models for mmW channels where both higher bandwidths and spatial/angular directionality will be critical for proper measurement and modeling of future wireless systems that use highly directional and adaptive antenna arrays in the mobile device or base station/access point. For example, measuring across wide bandwidths at mmW bands can be extremely difficult due to the complexity in synchronizing all frequency sources in a measurement system. Utilizing TX and/or RX MIMO antenna systems also increases complexity, at least in terms of the number of TX-RX paths that must be measured and/or modelled.

Accordingly, there may be a need to address at least some of the inadequacies, issues, and/or concerns with existing channel measurement devices and techniques described herein.

SUMMARY OF EXEMPLARY EMBODIMENTS

Accordingly, to address at least some of such issues and/or problems, certain exemplary embodiments of methods, systems, devices, and computer-readable media of the present disclosure can utilize techniques to measure one or more parameters of wideband, millimeter-wave (mmW) channels and/or calibrate systems used to measure such channels. Such exemplary embodiments of methods, systems, devices, and computer-readable media of the present disclosure can vastly out-perform conventional methods, techniques and systems in various known applications, including exemplary applications discussed herein.

Some exemplary embodiments of the present disclosure comprise a system for measuring a parameter of a millimeter wave (mmW) channel, comprising: a receiver (RX) device configured to receive a first signal from the mmW channel, generate a second signal, and measure the channel parameter based on a comparison between the first and second signals; and a controller configured to determine a first calibration of the system before measuring the channel parameter; determine a second calibration of the system after measuring the channel parameter; and determine a correction for the channel parameter measurement based on the first and second calibrations. Exemplary embodiments also includes methods embodying one or more operations that the controller is configured to perform. In various exemplary embodiments, the channel parameter can include at least one of a channel impulse response (CIR) and a power delay profile (PDP).

In some exemplary embodiments, the system further comprises a transmitter (TX) device comprising a TX frequency source. In some exemplary embodiments, the TX device is configured to, based on the TX frequency source: generate a first pseudorandom noise (PN) code, upconvert the first PN code to a radio-frequency (RF) signal, and transmit the RF signal into the mmW channel. In some exemplary embodiments, the RX device is further configured to receive the first signal from the mmW channel, and generate the second signal based on the TX frequency source. In some exemplary embodiments, the RX device further comprises an RX frequency source and is further configured to receive the first signal from the mmW channel and generate the second signal based on the RX frequency source. In some exemplary embodiments, the TX and RX frequency sources are connected during the determination of the first and second calibrations and are disconnected during the channel parameter measurements.

In some exemplary embodiments, the first signal comprises a first PN code and the second signal comprises a second PN code. In some exemplary embodiments, the RX device is further configured to generate the second PN code at different rate than the rate of the first PN code; and measure the channel parameter based on a sliding correlator. In some exemplary embodiments, the RX device is further configured to measure the channel parameter based on a wideband correlator.

Other exemplary embodiments of the present disclosure include a method for calibrating a system for measuring a parameter of a millimeter wave (mmW) channel, comprising: determining an first TX-RX delay between a transmitter (TX) device and a receiver (RX) device of the system; setting a trigger delay of the RX device based on the first TX-RX delay; during a particular measurement period, performing one or more measurements of the channel parameter at respective measurement times; determining a second TX-RX delay between the TX device and the RX device; and determining a timing offset for each of the one or more measurements based on the first and second TX-RX delays, the measurement period, and the measurement times. In various exemplary embodiments, the channel parameter can include at least one of a channel impulse response (CIR) and a power delay profile (PDP).

In some exemplary embodiments, determining the first TX-RX delays comprises separating the respective antennas of the TX and RX devices by a first distance; receiving, by the RX device, a signal transmitted by the TX device; measuring a timing delay between an RX trigger signal and a known signal or reference; and calculating the first TX-RX delay based on a measured timing delay and a propagation delay of the transmitted signal over the first distance. In some exemplary embodiments, the method further comprises substantially synchronizing an RX frequency source of the RX device and a TX frequency source of the TX device prior to determining the first TX-RX delay; and substantially re-synchronizing the RX and TX frequency sources after the particular measurement period. Exemplary embodiments also includes systems comprising controllers configured to perform one or more procedures of such exemplary methods.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which.

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

Figure 4:
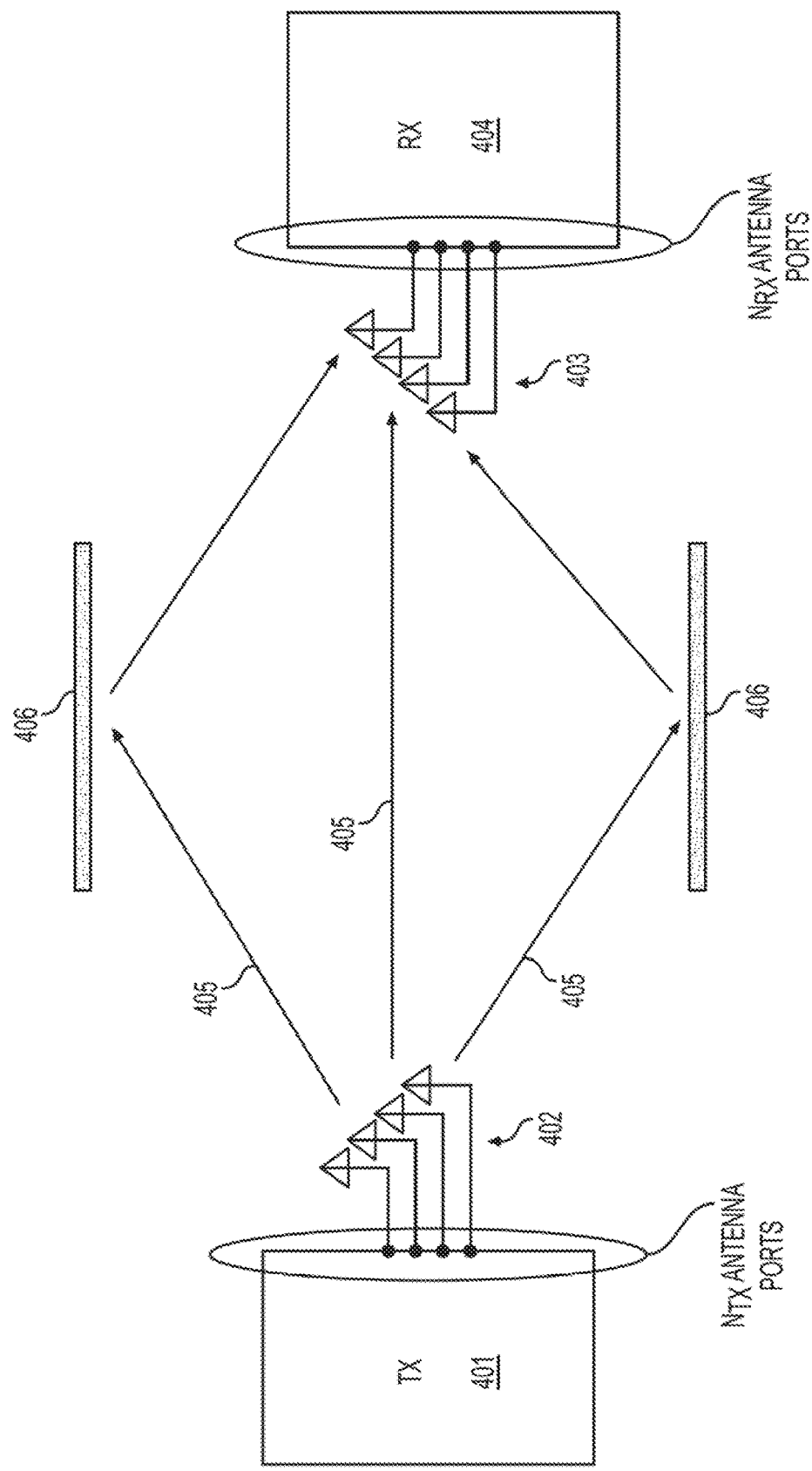
FIG. 4 is a block diagram of an exemplary wireless communication link/configuration between a TX device and an RX device, according to one or more exemplary embodiments of the present disclosure.

FIG. 4 shows a diagram of an exemplary wireless communication link configuration between a TX device (block 101) and a RX device (block 404) according to an exemplary embodiment of the present disclosure. For example, the TX device (block 401) has $N_{TX}$ antenna ports, which are connected to its antenna elements (block 402). Similarly, the RX device (block 404) has $N_{RX}$ antenna ports, which are connected to its antenna elements (block 403). Depending on the embodiment, each of $N_{TX}$ and $N_{RX}$ can be or include one (single antenna) or more than one (multiple antennas). RF signals can be carried between the respective antenna ports and the respective antenna elements. Between the TX and RX antennas, radio waves can propagate along a plurality of paths (405), the paths having different path-gains, delays and angles of arrival and departure. These exemplary signals can be super-imposed at the receiver to create multi path interference. The particular set of paths can be determined by the physical objects in the environment (406), and can change as a result of mobility of the TX, RX, or physical objects in the wireless environment. At the TX (401), each path can be mathematically represented by spatial signature, which is a vector of size $N_{TX}$. Similarly at the RX, each path has a spatial signature, which is a vector of size $N_{RX}$. One exemplary method/procedure to test the DUTs can involve performing over-the-air (OTA) experiments in urban, semi-urban, and rural conditions, under different geographical, mobility, weather, and fading scenarios. Such tests can be performed using channel measurement systems, also known as channel sounders, which can comprise specialized TX and RX devices such as those shown in FIG. 4.

Exemplary methods/systems for channel sounding include one or more of: i) direct RF pulse systems; ii) frequency-swept network analyzers; and iii) spread spectrum time-dilated sliding correlators. A direct RF pulse system can be the simplest of the three; it generates and repetitively transmits a short probing time-domain pulse with a period longer than the maximum expected excess delay of the channel. The receiver can comprise an envelope detector such as a high-speed, wideband digital oscilloscope. Although the direct RF pulse system is extremely simple, it typically lacks coherent phase detection, can be sensitive to noise and interference, and has a minimum multipath delay resolution of the width of the transmitted pulse.

The second exemplary channel sounding method can utilize a Vector Network Analyzer (VNA) that measures the S21 parameter (e.g., forward voltage gain or transfer function) of the wireless channel via discrete narrowband frequency steps across the bandwidth of interest (often referred to as "frequency swept sounding"), followed by an Inverse Discrete Fourier Transform (IDFT) of the channel transfer function which results in the complex channel impulse response (CIR). When used for wideband channels such as those proposed for use in mmW spectrum, limiting factors of this exemplary scheme can include: 1) time required to sweep across a broadband spectrum (e.g., many seconds), during which the channel may not be stationary; and 2) potentially long cable connections between the transmitter (TX), receiver (RX), and VNA required to conduct the measurements. Such cabling requirements can be workable for measurements of indoor channels across relatively short TX-RX separation. For exemplary measurements of outdoor channels with greater TX-RX distances, however, this method usually requires a complex RF-to-fiber connection with proper calibration, precautions, and permissions.

A sliding correlator can be the third type of channel sounding system. Such exemplary correlator can utilize a time-domain, spread-spectrum technique by transmitting a wideband, pseudorandom noise (PN) sequence at a rate of $TX_{rate}$ with chip period of $TX_{chip} = 1/TX_{rate}$ that can result in an RF null-to-null bandwidth of $2 \cdot TX_{rate}$. At the receiver, the wideband signal can be filtered and de-spread (e.g., bandwidth-collapsed) using the identical PN sequence as generated at the TX, but at a slightly offset rate that facilitates the received signal to "slide" past the slower, RX-generated sequence. This can result in a time-dilated channel impulse response that can be narrowband-filtered and detected by a narrowband digitizer or oscilloscope. This exemplary method does not require a wideband digital oscilloscope to record the channel impulse response, although it can use a more complex system design, additional hardware, and a longer acquisition period due to the time dilation. Like the others, the sliding correlator method records only a relative time-delay CIR or power delay profiles (PDP).

Various exemplary embodiments of channel sounding devices and/or systems can utilize highly-directional horn antennas (e.g., gain concentrated at a relatively small angular range of azimuth and elevation) in order to overcome the additional path loss experienced at higher frequencies, as compared to loss experienced at lower bands. Such directional antennas also enable measurement of the complex CIR and/or PDP at higher resolution of azimuth and elevation angles of departure (AOD, e.g., for TX) and angle of arrival (AOA, e.g. for RX). Moreover, multiple RF chains and RX antennas allow for digital and/or analog phased-array measurements that can help to resolve angles of arrival. Without such hardware, however, the desired omni-directional CIR and/or PDP should be synthesized from sequential measurements at particular AOD and/or AOA. If $\theta r_w$ is the $w^{th}$ receive antenna azimuth angle, $\varphi r_x$ is the $x^{th}$ receive antenna elevation angle, $\theta t_y$ is the $y^{th}$ transmit antenna azimuth angle, and $\varphi t_z$ is the $z^{th}$ transmit antenna elevation angle, $Pt_{i,j}$ is the transmit power (in dBm) at transmitter location i and receiver location j, and $Pr_{i,j}(\theta r_w, \varphi r_x, \theta t_y, \varphi t_z)$ is the measured received power (e.g., area under PDP, in mW) for the angular orientation set $\{\theta r_w, \varphi r_x, \theta t_y, \varphi t_z\}$ at location pair $\{i, j\}$, then the total omnidirectional path loss for location pair $\{i, j\}$ is given by:

$$PL_{i,j}[dB] = Pt_{i,j}[dBm] - 10\log_{10}\left[\sum_z \sum_y \sum_x \sum_w Pr_{i,j}(\theta r_w, \phi r_x, \theta t_y, \phi t_z)[mW]\right]$$

For a given location pair $\{i, j\}$, if measurements $Pr_{i,j}(\theta r_w, \varphi r_x, \theta t_y, \varphi t_z)$ for all angular orientation sets $\{\theta r_w, \varphi r_x, \theta t_y, \varphi t_z\}$ are taken over a period of time (e.g., minutes), the channel measurement components must be tightly synchronized to avoid drifts in the TX and RX timing references (e.g., oscillators or clocks) that would introduce a variable error or offset in the constituent angular measurements, resulting in an incorrect determination of an omnidirectional PDP relative to the omnidirectional path loss.

Existing channel measurement systems can address the synchronization issue in various ways, including, e.g.: 1) being connected by cable; 2) recording non-absolute time PDPs; 3) using omnidirectional TX and/or RX antennas that do not require sequential measurements but suffer from low gain; 4) using commercial-off-the-shelf (COTS) equipment that have synchronization built-in; or 5) using COTS equipment designed for smaller signal bandwidths or lower frequencies (e.g., microwave). Nevertheless, given the benefits of directional mmW channel sounders (e.g., higher gain), one of the most desirable capabilities is the ability to "cut the cord" between the TX and RX but still record absolute time-delay PDPs that can be useful for mmW ray-tracing design and simulations.

With current technologies and faster analog-to-digital converters (ADCs) that can accurately capture wideband signals for processing, a truly coherent acquisition and software-based wideband cross-correlation PDP can be resolved as described for the prototype introduced in this paper.

Figure 1:
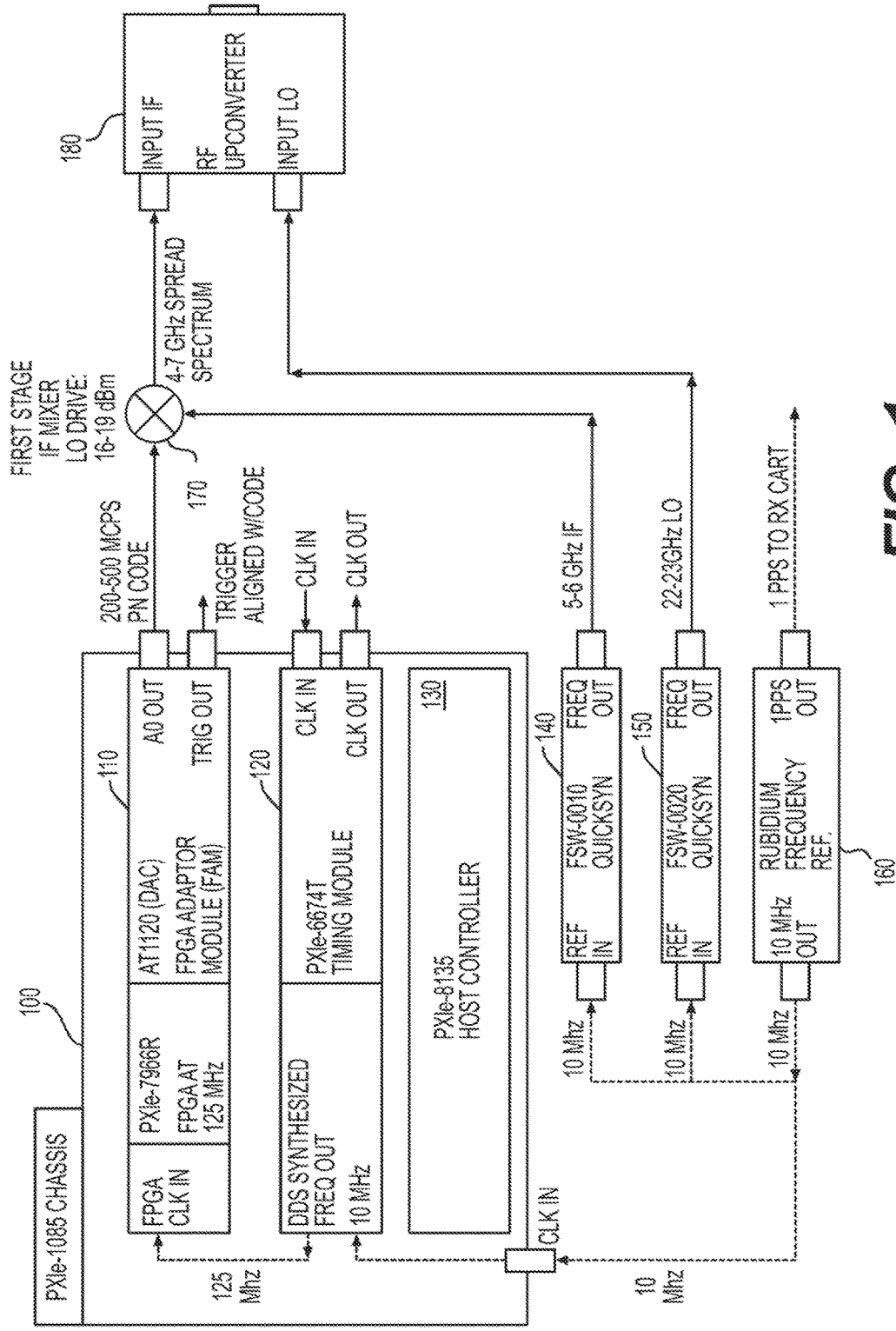
FIG. 1 is a block diagram of an exemplary transmitter (TX) unit/apparatus comprising a channel measurement system, according to one or more exemplary embodiments of the present disclosure.

FIG. 1 shows a block diagram of an exemplary TX unit/apparatus according to an exemplary embodiment of the present disclosure comprising a channel measurement system according to one or more exemplary embodiments of the present disclosure. Chassis 100 can comprise various exemplary components that can be placed in the same physical enclosure (e.g., chassis), or can be distributed across a small number of physical chassis. An exemplary chassis can be based on a PCI backplane. In such exemplary embodiments, components distributed across multiple physical chassis can be connected together to create a virtual PXI backplane. PCI (Peripheral Component Interconnect)

Back-Plane and Trigger Bus can facilitate such interconnection, as known to persons of ordinary skill.

In the exemplary embodiment shown in FIG. 1, chassis 100 can house various modules including modules 110, 120, and 130. Chassis 100 can be a PXIe-1085 18-slot chassis, module 110 can be a PXIe-7966R field-programmable gate array (FPGA) module coupled with an Active Technologies (AT)-1120 FPGA Adapter Module (FAM) digital-to-analog converter (DAC), module 120 can be a PXIe-6674T timing unit, and module 130 can be a PXIe-8135 Host Controller. Unless specifically noted, all of the above are available from National Instruments ("NI"). The exemplary system also includes a TX frequency reference 160, which is shown in FIG. 1 as a PRS-10 rubidium (Rb) frequency reference with a 10-MHz output. The output of reference 160 is connected to a reference input on chassis 100, which then supplies the reference to the modules 100-130. For example, the 10-MHz output from the PRS-10 can be connected to the 10-MHz input on the PXIe-1085e chassis and can be supplied across the chassis backplane to each module. Using the 10-MHz reference, the PXIe-6674T can be programmed to generate a 125-MHz clock signal and distribute the clock to one or more other modules (e.g., module 110) via the backplane of chassis 100.

Module 110 can be programmed to generate a pseudo-random noise (PN) sequence. For example, the PXIe-7966R FPGA module can be programmed (e.g., via LabVIEW FPGA software) to generate a PN sequence with a period of 2047 chips at variable rates between 200 and 500 mega-chips-per-second (Mcps). Furthermore, the AT-1120 FAM DAC can be programmed to output analog samples of the PN sequence at a rate up to 2 GHz (e.g., four samples per chip for 500 Mcps PN rate). Both exemplary components of module 110 can generate their respective signals based on the supplied 125-MHz clock signal.

In some exemplary embodiments according to an exemplary embodiment of the present disclosure, the variable-rate PN sequence can be generated using an 11-bit, linear feedback shift register (LFSR) state machine digital logic circuit comprising a leap-forward (LF) architecture. The exemplary LFSR begins with a value of "1" in all states, and the $11^{th}$ and $9^{th}$ taps are exclusive-or'd (XOR) and fed back to the start of the sequence (e.g., tap 1). Indeed, other XOR configurations that utilize and/or include more or different taps can be employed to generate other PN sequences. In the exemplary embodiment shown in FIG. 1, the leap forward LFSR architecture can be used to generate PN sequences and output analog samples at rates higher than the 125 MHz signal by the PXIe-6674T. The LFSR leap-forward circuitry and state-machine allows the LFSR PN generator to "leap-forward" a number of states between successive loops so as to have access to enough chips to generate the correct probing signal. For example, the leap-forward architecture can provide 16 time-interleaved channels that are accessible in each single-cycle timed loop (SCTL), which enables the 125 MHz×16=2 GHz sampling rate.

Figure 5:
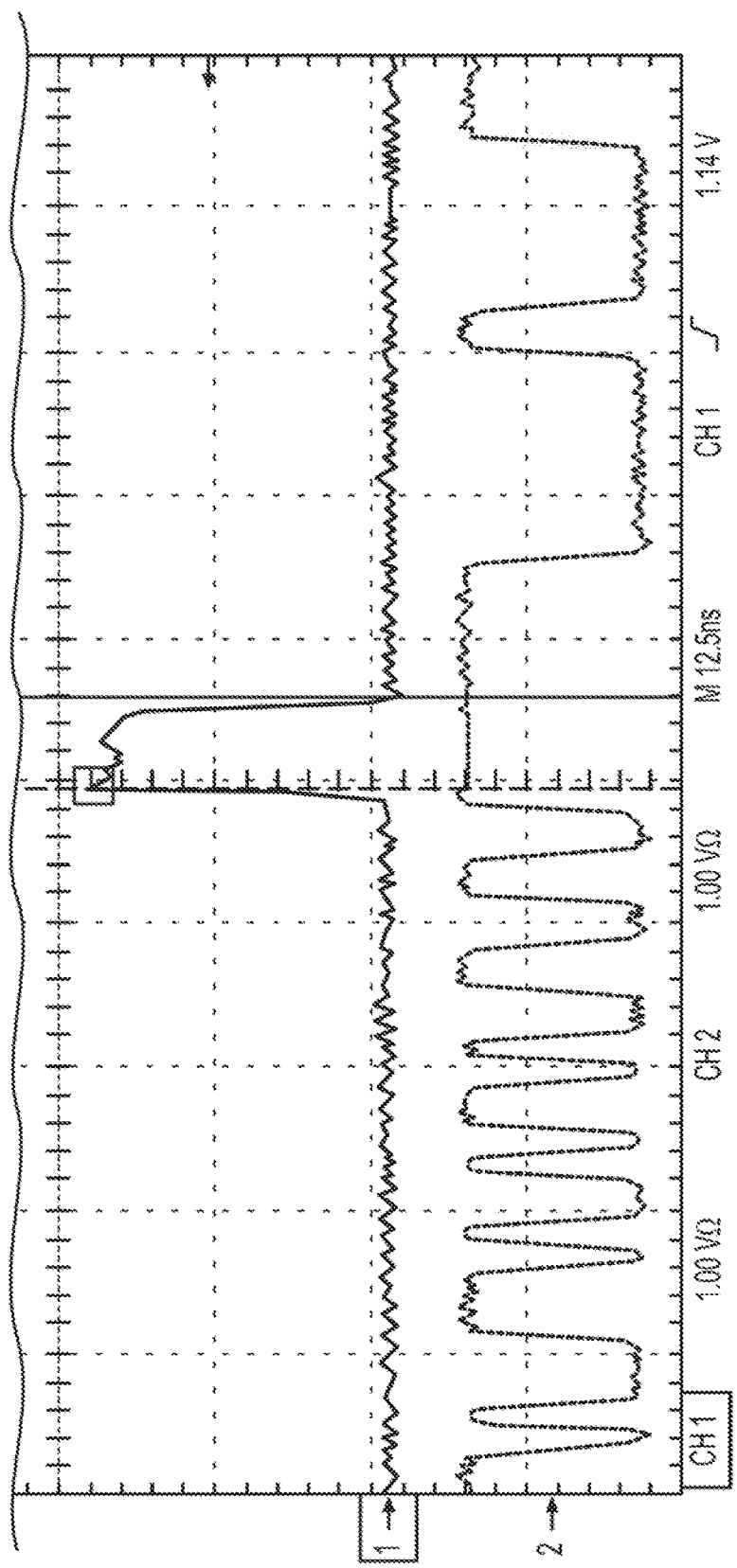
FIG. 5 is an exemplary oscilloscope screen image showing the timing synchronization between an exemplary pseudorandom noise (PN) code and a trigger signal generated by an exemplary TX device, according to more exemplary embodiments of the present disclosure.

Module 110 can be further configured to generate a trigger signal at a particular point of the PN sequence. Such a trigger signal can be used, e.g., for synchronizing the RX unit of the channel measurement system to the TX unit shown in FIG. 1, as discussed further below. The output of such an exemplary operation is illustrated in FIG. 5, which shows an exemplary image captured by an oscilloscope. In this exemplary image, the start of the PN sequence is indicated by the transition to the long "high" period (e.g., 11 consecutive "ones") near the middle of the bottom trace, and the trigger signal is aligned precisely with the start of the PN sequence (tiny cable delay). In some embodiments, however, the starting point of the trigger signal can be programmed flexibly to take into account any delays (e.g., due to cables or other systematic causes) between the TX and RX units. For example, given the 125-MHz clock input, the timing of the trigger signal can be adjusted by module 110 in 8-ns (1/125-MHz) increments.

Referring back to FIG. 1, the baseband PN sequence generated by module 110 can be modulated by IF module 170 using the output of module 140, which in some exemplary embodiments can be an intermediate-frequency (IF) signal between 4 and 7 GHz. The exact IF frequency can be selectable based on the desired mmW output frequency of the TX device. In the exemplary embodiment shown, module 140 can be a Phase Matrix FSW-0010 QuickSyn frequency synthesizer connected to the 10-MHz reference generated by module 160, e.g., the PRS-10 Rb frequency reference. The modulated IF output of module 170 can have a null-to-null bandwidth of twice the chip rate of the PN sequence. For example, a 500-Mcps PN sequence can produce a 1-GHZ bandwidth at the output of module 170.

The IF output of module 170 can then be applied to an RF up-converter module 180, along with a local oscillator (LO) signal supplied by module 150. In the exemplary embodiment shown in FIG. 1, module 150 can be or include a FSW-0020 QuickSyn frequency synthesizer that can generate the LO signal based on the 10-MHz reference signal from module 160, e.g., the PRS-10 Rb frequency reference. The LO signal can have a frequency between 22 and 23 GHz, which can be selected according to the desired mmW frequency. Any suitable mmW RF up-converter can be employed for module 180, including, e.g., the one described in S. Nie, et al., "72 GHz millimeter wave indoor measurements for wireless and backhaul communications," IEEE 24TH INT'L SYMP. PERSONAL INDOOR & MOBILE RADIO COMM's (PIMRC) 2429-33, September 2013. For example, when the exemplary channel sounding system is utilized to sound channels in the 73-GHz (E-band) spectrum, RF up-converter module 180 can be configured to triple the frequency of the LO input so as to translate the spread-spectrum IF signal to the desired mmW frequency.

Figure 7A:
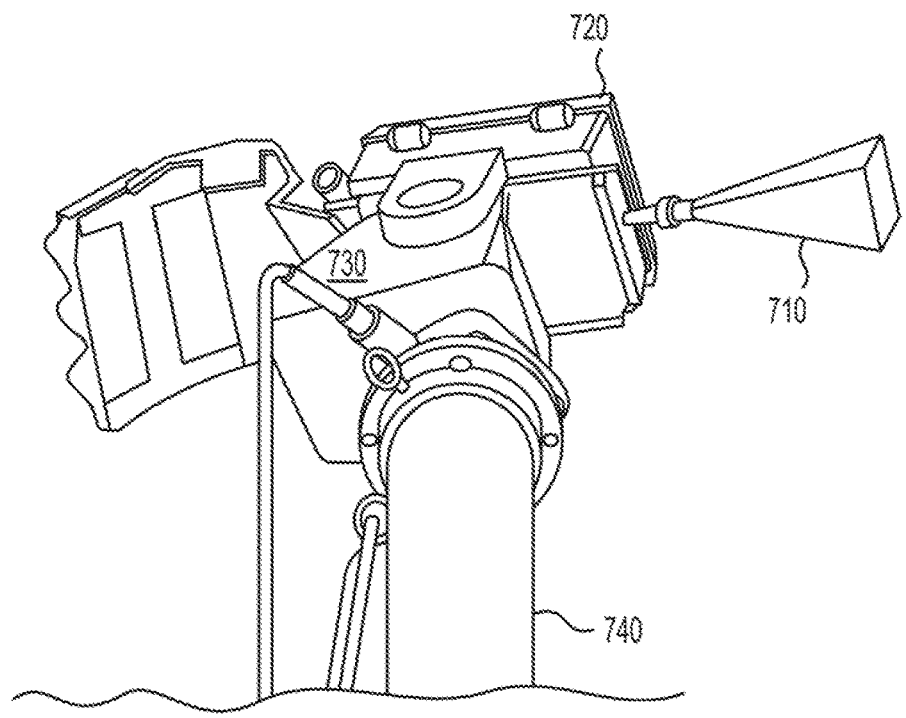
FIGS. 7(a) and 7(b) are images of exemplary TX and RX antenna systems, respectively, comprising an exemplary channel measurement system, according to exemplary embodiments of the present disclosure.

In various exemplary embodiments of the present disclosure, the exemplary TX device shown in FIG. 1 can be coupled with highly-directional antennas. A photograph of such an exemplary configuration is shown in FIG. 7(a). In the exemplary configuration shown in FIG. 7(a), a TX directional horn antenna 710 can be mounted to RF up-converter 720, which can correspond to module 180 shown in FIG. 1. In order to control and/or manipulate the AOD azimuth and elevations, RF up-converter 720 can be mounted to a pan-tilt gimbal 730 (e.g., a FLIR Pan-Tilt D100 gimbal) that is further mounted to a mast 740.

Figure 7B:
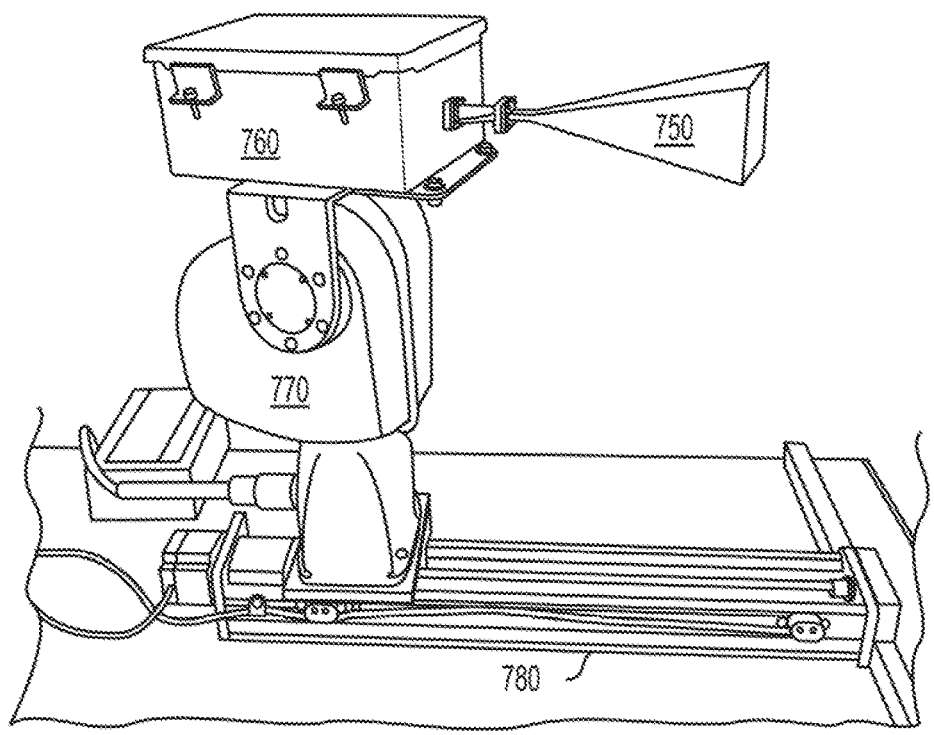

FIG. 7(b) shows an exemplary configuration of an antenna system for an RX device comprising a channel measurement system according to one or more embodiments of the present disclosure. In this exemplary embodiment, RX directional horn antenna 750 can be mounted to RF down-converter 760, which can correspond to module 295 shown in FIG. 2 or module 395 shown in FIG. 3. RF down-converter 760 can be mounted to a pan-tilt gimbal 770 (e.g., a FLIR Pan-Tilt D100 gimbal) that can be further mounted to a slidable track 780, such that the gimbal can be moved to different positions along the slidable track.

Figure 6:
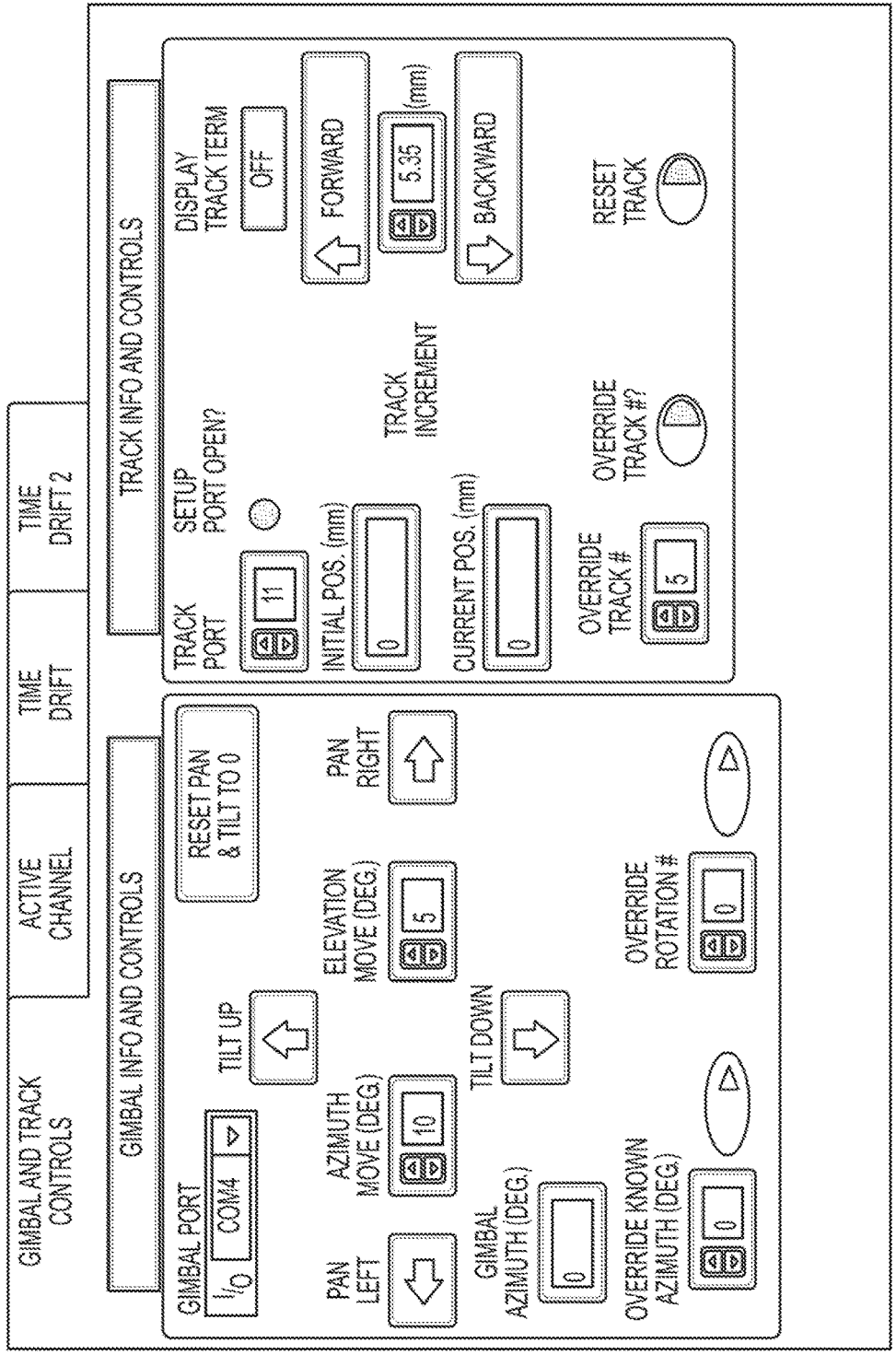
FIG. 6 is an exemplary antenna-control graphical user interface (GUI), according to one or more exemplary embodiments of the present disclosure.

The control and/or manipulation of the exemplary TX and RX antennas can be accomplished in various ways, including via a graphical user interface (GUI) on a general-purpose or application-specific computing device, a controller without a graphical user interface (e.g., a specially-configured Playstation or Xbox gaming controller), or by other means known to skilled persons. An exemplary antenna-control GUI developed using LabVIEW software is shown in FIG. 6. As shown in FIG. 6, the GUI provides control of the azimuth and elevation via a gimbal (e.g., gimbal 730), as well as the position of the gimbal along a slidable track. The exemplary GUI provides the ability to set angular and lateral positions, as well as the ability to set increments for angular and lateral positioning changes.

Figure 2:
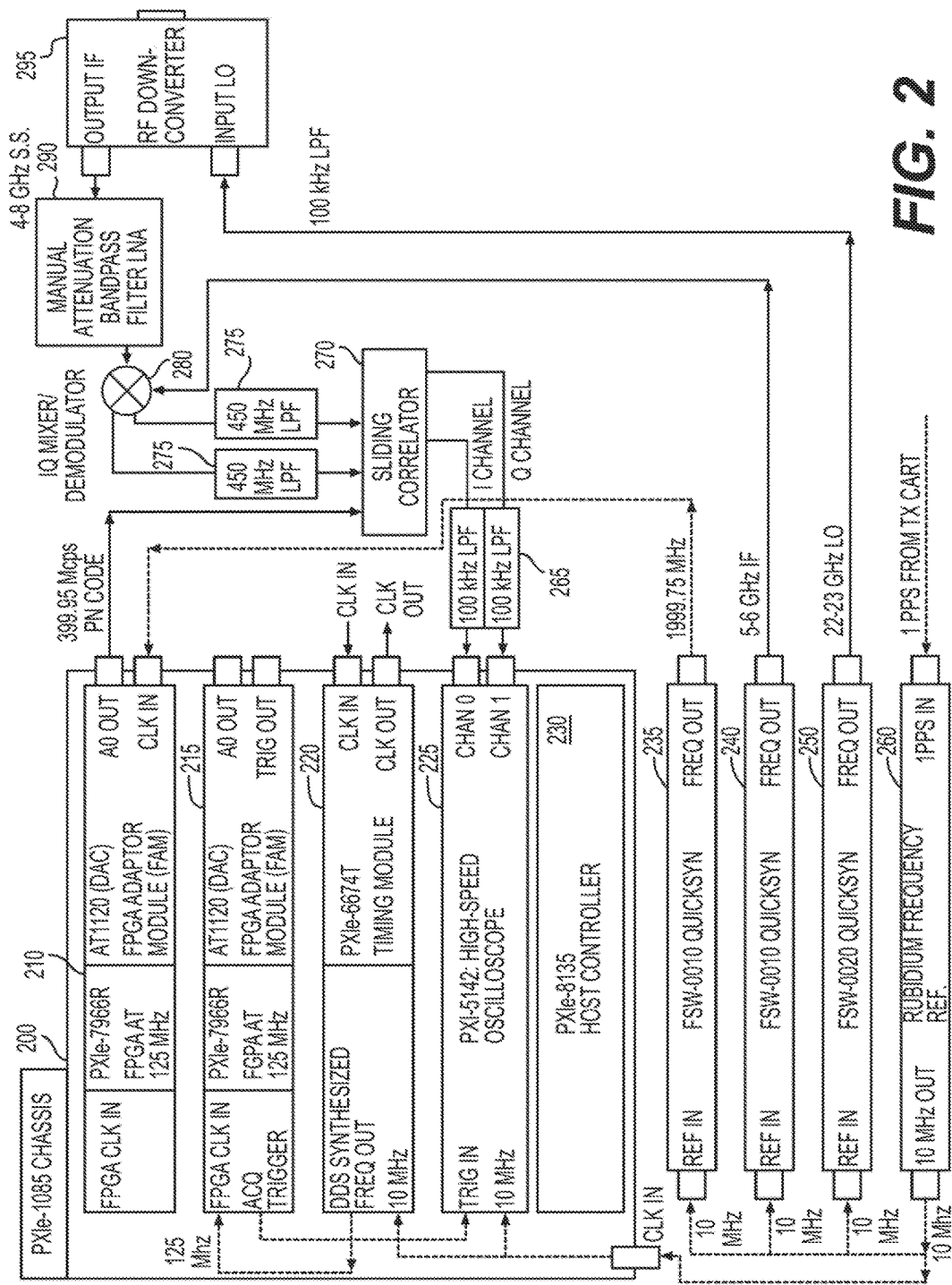
FIG. 2 is a block diagram of an exemplary sliding correlation receiver (RX) unit/apparatus comprising a channel measurement system, according to one or more exemplary embodiments of the present disclosure.
Figure 3:
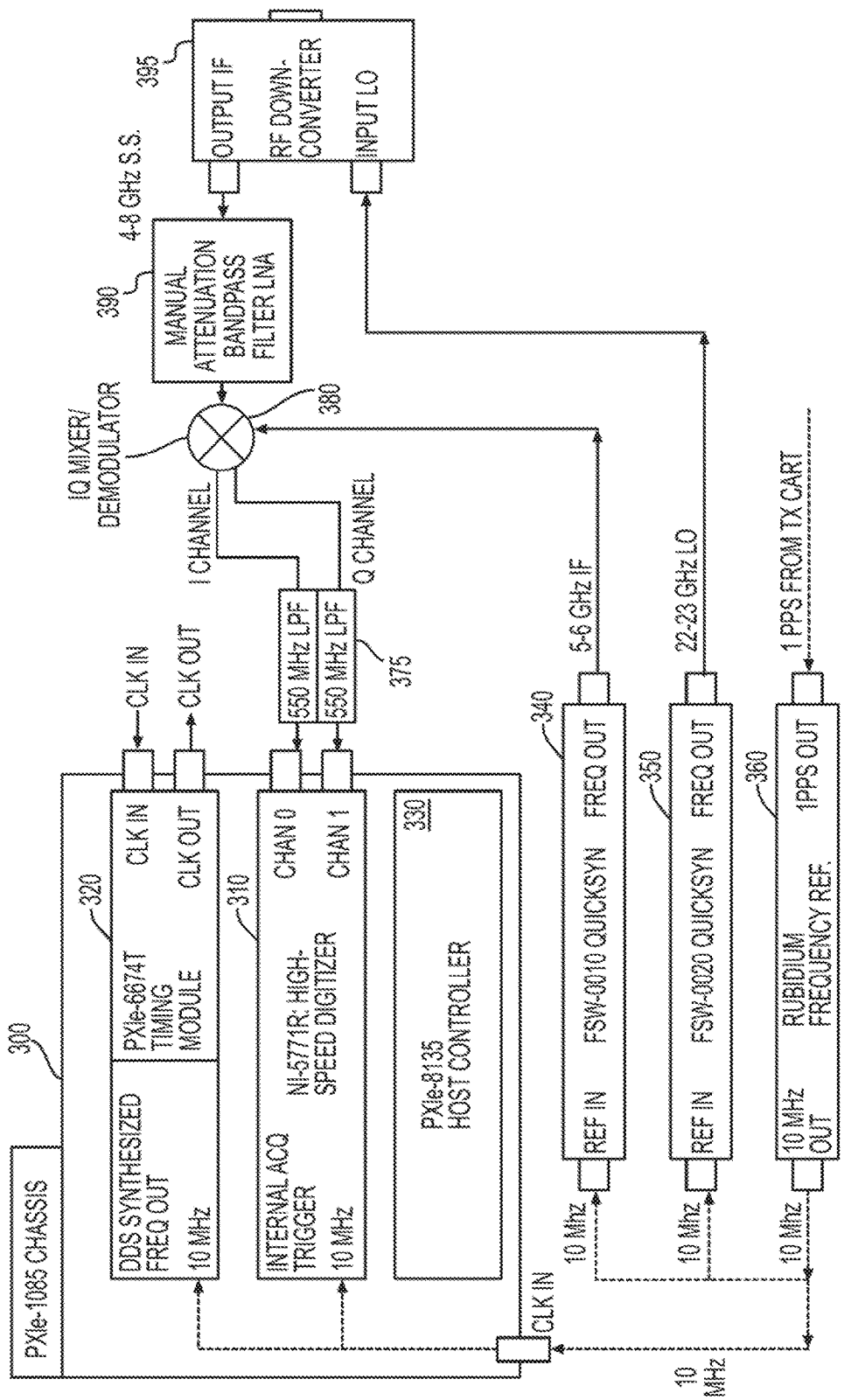
FIG. 3 is a block diagram of an exemplary wideband correlation RX unit/apparatus comprising a channel measurement system, according to one or more exemplary embodiments of the present disclosure.

FIGS. 2 and 3 show block diagrams of exemplary RX units/apparati/devices according to exemplary embodiments of the present disclosure comprising a channel measurement system according to various exemplary embodiments of the present disclosure. FIG. 2 illustrates an exemplary embodiment based on a sliding correlation technique, and FIG. 3 illustrates an exemplary embodiment based on a wideband correlation technique. In FIGS. 2 and 3, modules 260 and 360 correspond to frequency reference 160 shown in FIG. 1; modules 250 and 350 correspond to RF LO module 150 shown in FIG. 1; modules 240 and 340 correspond to IF LO module 140 shown in FIG. 1; modules 230 and 330 correspond to host controller module 130 in FIG. 1; modules 220 and 320 correspond to timing module 120 shown in FIG. 1; and modules 210 and 310 correspond to timing module 110 shown in FIG. 1. For each of these exemplary modules, the corresponding description above with respect to FIG. 1 has been provided herein.

Referring to FIG. 2, a mmW signal is input to RX down-converter module 295. This mmW signal can be or include the output of a directional antenna, such as the directional horn antenna 710 shown in FIG. 7. Module 295 can also be provided with an RF LO signal from module 250, which can have a frequency selectable according to the input mmW frequency. The RF LO signal can be generated based on the 10-MHz reference provided by module 260. The output of down-converter module 295 can be a spread-spectrum signal at an IF between 4 and 7 GHz. This IF signal is applied to selectable attenuator 290, which can be configured to provide a range of gains and/or attenuations (e.g., 0 to −70 dB) for gain control. Module 290 also can include a bandpass filter (BPF) with an exemplary passband in the range of 4-8 GHz. The BPF output signal can be amplified by a low-noise amplifier (LNA) (incorporated, e.g., in module 290) before being output to IQ mixer/demodulator 280, which also receives an IF LO signal supplied by module 240, which can be configured to have a frequency between 5 and 6 GHz. Based on these two signals, IQ mixer/demodulator 280 can output a complex (I/Q) baseband signal with null-to-null bandwidth of the TX PN sequence chip rate (e.g., 400 MHz for a 400-Mcps chip sequence). The baseband signal can be applied to complex low pass filter (LPF) 275, which can be configured with a cutoff frequency slightly above the TX PN sequence chip rate (e.g., 450 MHz for a 400-Mcps chip sequence). LPF 275 can provide anti-aliasing functionality.

In the exemplary embodiment shown in FIG. 2, the output of LPF 275 can be applied to sliding correlator module 270. The sliding correlator 270 can be configured for various chip rates (e.g., between 200 and 500 Mcps), while the exemplary embodiment shown in FIG. 2 and described below is provided for a nominal 400-Mcps chip rate. In addition, sliding correlator 270 can receive an RX PN sequence from module 210 that is nearly identical to the TX PN sequence in the output of LPF 275, with the respective chip rates offset by a very small amount. For example, with a 400-Mcps TX PN sequence rate, the corresponding RX PN sequence can be configured to have a 399.95-Mcps rate. This can be done by using a second LO frequency synthesizer module 235 (also synchronized to the 10-MHz reference generated by module 260) to generate a 1999.75-MHz reference signal that can be frequency-divided to obtain the 399.95-Mcps chip rate.

Sliding correlator 270 can mix the received wideband signal (output of LPF 275) with the locally-generated RX PN sequence to output a complex (I/Q) impulse response signal having the bandwidth of the difference between the chip rates of the two inputs, e.g., 400 MHz−399.95 MHz=50 kHz. This signal can then be applied to complex LPFs 265, which can be configured with a cutoff frequency of 100 kHz. The resulting signal can then be sampled by data acquisition module 225, which is a PXI-5142 high-speed oscilloscope module in the exemplary embodiment shown. Module 225 can receive an acquisition trigger via the backplane of chassis 200 from timing module 215, which in the exemplary embodiment is a PXI-7966R FPGA module. This trigger can be configured as the period of the time-dilated channel impulse response, and can be manually adjustable (e.g., by a GUI developed using LabVIEW) to trigger at rates different than the period of the time-dilated PDP. Module 225 can also receive a 10-MHz reference via the backplane of chassis 200 from module 260, which can facilitate synchronous sampling of the input signal.

The RX device of the channel measurement system can be further configured to capture consecutive samples of the complex I/Q impulse response, compute PDP samples by the sum of the squares of the I/Q samples, and then sum (or average) the PDP samples to arrive at a PDP estimate. With the exemplary sliding correlation method and parameters described above, one PDP sample can be captured, e.g., every (2047 chips)/(400.00−399.95 Mcps)=40.94 milliseconds (ms). This PDP sampling rate gives the capability to measure a Doppler shift range of 1/40.94 ms=24.4 Hz, or equivalently a range of +/−12.2 Hz. The number of PDP samples to be summed or average is a tradeoff, with longer averaging resulting in reduced measurement noise but at the expense of longer measurements and less Doppler resolution capability. For example, averaging 20 PDP samples would require 818.8 ms.

FIG. 3 illustrates an exemplary embodiment based on a wideband correlation technique according to an exemplary embodiment of the present disclosure. The exemplary operations of blocks 380, 390, and 395 correspond to the respective operations of blocks 280, 290, and 295 described above with respect to FIG. 2. IQ mixer/demodulator 380 can output a complex (I/Q) baseband signal with null-to-null bandwidth of the TX PN sequence chip rate (e.g., 500-MHz for a 500-Mcps chip sequence). The baseband signal can be applied to complex low pass filter (LPF) 375, which can be configured with a cutoff frequency slightly above the TX PN sequence chip rate (e.g., 550 MHz for a 500-Mcps PN sequence). The resulting signal can then be sampled by data acquisition module 310, which is an NI-5771R 8-bit high-speed digitizer in the exemplary embodiment shown. Module 310 can be configured to sample the input signal at an integer multiple of the nominal chip rate, e.g., 1.5 GHz for 500-Mcps rate. Module 310 can be configured to derive the sampling clock from the 10-MHz reference signal, which can be provided via the backplane of chassis 300.

In some exemplary embodiments, module 310 can further comprise a storage module for storing sampled data for additional host processing. For example, such a storage module can be constructed from a PXIe-7966R FPGA module programmed to store samples in DRAM and then transfer samples via DMA to a first in, first out (FIFO) queue for additional processing. Such additional processing can include performing a cross-correlation (e.g., matched filter) between the received samples and the target, 2047-chip TX PN sequence, as well as remove any known distortions of the transmitted waveform. The resulting exemplary complex correlation results—which represent the complex channel impulse response (CIR)—while the power magnitude can be averaged over multiple sample period to reduce measurement noise of a PDP, albeit with the tradeoff between noise and Doppler resolution as discussed above. However, since the wideband correlator exemplary embodiments do not dilate the CIR/PDP, the Doppler resolution is primarily determined by the time required for capture and additional processing of each CIR sample. In some exemplary embodiments, a set of 40 complex CIR sample periods can be collected, and power magnitudes averaged to produce a PDP estimate at least every 2.2 ms, giving the capability to measure a Doppler shift range of 1/2.2 ms=446 Hz, or equivalently a range of +/−223 Hz. Averaging the power magnitudes of 40 complex CIR sample periods to produce a PDP sample requires only 88 ms, much less than the sliding correlator technique discussed above.

Although exemplary embodiments were described above as using a chassis housing one or more commercially-available processing modules, channel measurement systems of the present disclosure can be implemented by using several types of hardware including (but not limited to): (a) FPGAs; (b) digital signal processors (DSPs); (c) graphical processing units (GPUs); (d) application specific integrated circuits (ASICs); and (e) general purpose central processing units (CPUs). Moreover, such exemplary systems can be implemented by any combination of hardware, firmware, and software including both commercially-available (e.g., LabVIEW) as well as custom-developed software applications.

In addition, although exemplary embodiments were described above as using PN sequences, channel measurement systems and methods of the present disclosure can be implemented by using a variety of signals. Other time-domain, complex, or frequency-domain (OFDM or Frank-Zadoff Chu) based sounding signals, or combinations thereof, may be used in various exemplary embodiments.

Furthermore, although exemplary embodiments were shown and described above as comprising TX devices including a single TX antenna and RX devices including a single RX antenna and a single receiver chain, channel measurement systems and methods of the present disclosure can be implemented by using a various multi-antenna architecture. For example, channel measurement systems can incorporate $N_{TX}$ antenna ports coupled to $N_{TX}$ antenna elements and $N_{RX}$ antenna ports coupled to $N_{RX}$ antenna elements. As described above with respect to FIG. 4, each of $N_{TX}$ and $N_{RX}$ can be greater than one. In some embodiments, the TX device and/or the RX device can include MIMO antenna systems.

Various multi-antenna TX and RX configurations are also disclosed in U.S. Provisional Patent Appl. No. 62/143,865, entitled "SWITCHED ANALOG-DIGITAL ARCHITECTURE FOR WIRELESS ANTENNA ARRAYS AND METHODS FOR USE THEREOF," filed Apr. 7, 2015, the entire disclosure of which is incorporated herein by reference. Such configurations can be utilized in various exemplary channel measurement systems of the present disclosure. For example, such exemplary systems can utilize multiple RX antennas, each with its own receiver chain, in a manner to perform digital beamforming by modifying the respective phases and/or amplitudes of the signals output by the respective receivers prior to combination. In a similar manner, such exemplary systems can utilize analog RX beamforming with a phased array and analog RX phase shifters to change the phase of the received signal(s) at RF, IF, or baseband.

Figure 13:
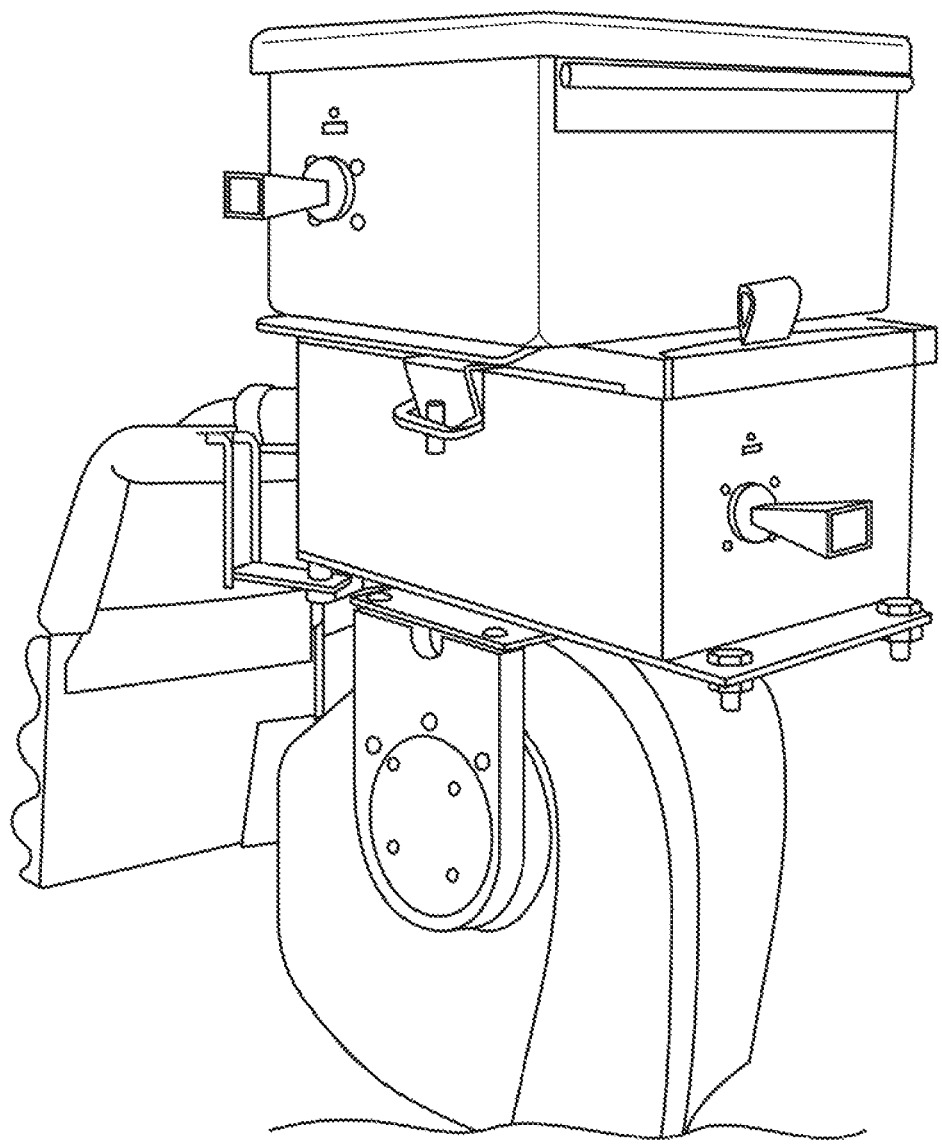
FIG. 13 is an image of an exemplary multi-antenna RX device comprising an exemplary channel measurement system, according to exemplary embodiments of the present disclosure.

In addition to the single steerable horn antenna as shown in FIG. 7(b), exemplary channel measurement systems and methods of the present disclosure can also utilize RX devices comprising a plurality of steerable horns antennas, each with an independent RF downconverter. FIG. 13 shows an exemplary RX device configured in such a manner. The skilled person will readily comprehend that exemplary channel measurement systems of the present disclosure can incorporate similarly-configured TX devices. Such multi-RX (and/or multi-TX) embodiments can facilitate substantially simultaneous measurements of parameters (e.g., CIRs and/or PDPs) for different channels. Such channels may differ in one or more of frequency, bandwidth, and/or spatial relationship between the TX and RX antennas. Spatial relationship can include—but is not limited to—relative azimuth, elevation, height, and/or distance between the TX-RX antenna pairs. Such measurements can facilitate temporal and/or spatial channel modeling analysis.

Furthermore, exemplary channel measurement systems and methods of the present disclosure can also include multi-antenna RX and/or TX devices that comprise a combination of antenna technologies. For example, an RX device can include both one or more phased arrays and one or more directional horn antennas, each with a corresponding RF downconverter. A multi-antenna TX device can be similarly configured with corresponding RF upconverters. Measurements made using such configurations can facilitate temporal and/or spatial comparative analysis between different pairs of TX and RX antennas (e.g., different antenna apertures, patterns, beamwidths, etc.).

Figure 8:
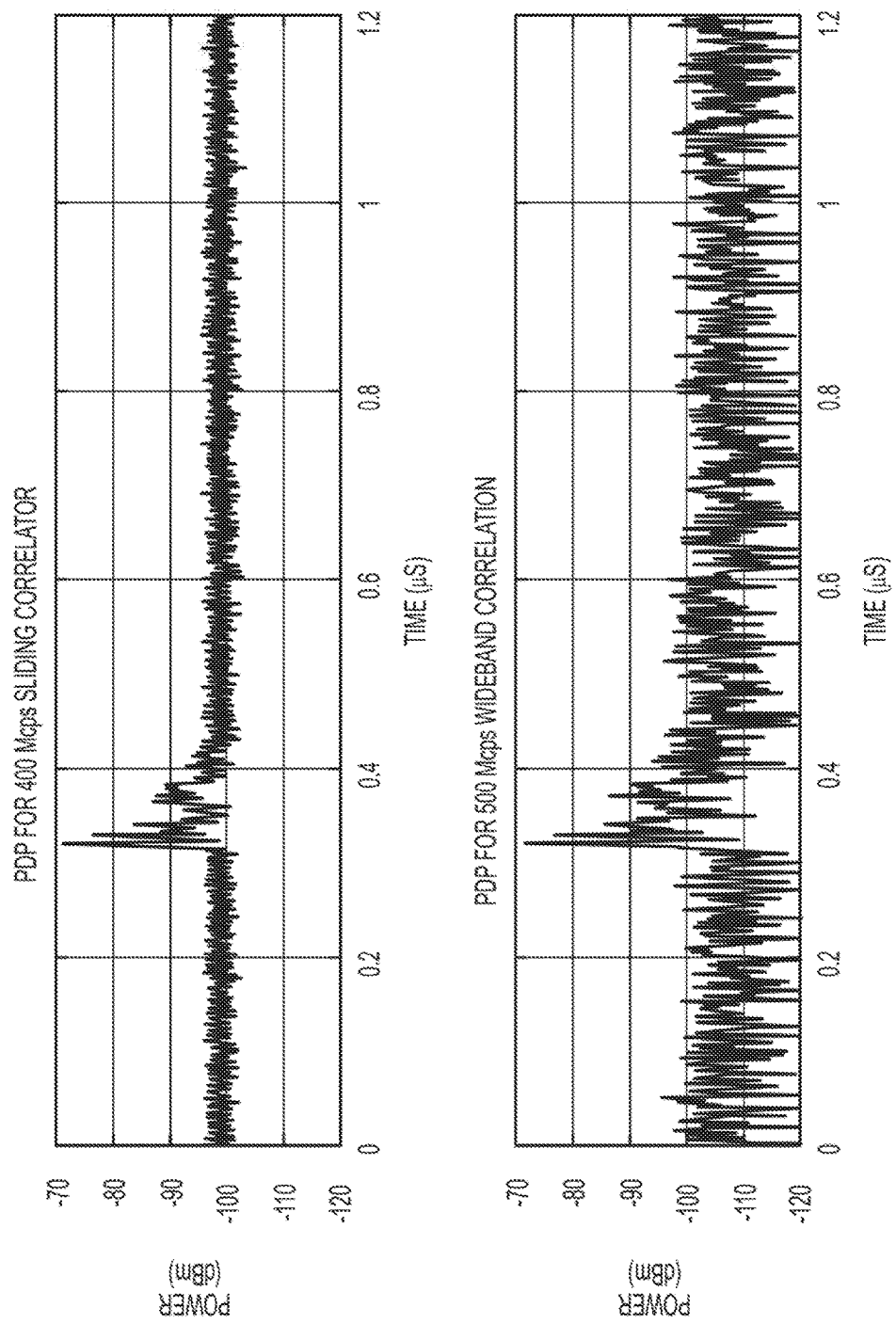
FIG. 8 is an exemplary graph of a power delay profile (PDP) for a 28-GHz, indoor multipath channel measured by an exemplary channel measurement system, according to one or more exemplary embodiments of the present disclosure.

FIG. 8 illustrates graphs of estimated PDP versus delay for a 28-GHz, indoor multipath channel for each of the two exemplary channel measurement system embodiments discussed above. The top graph shows the PDP estimate for the sliding correlator embodiment having a chip rate of 400-Mcps and a 40.94-ms measurement period, while the bottom graph shows the PDP estimate for the wideband correlator embodiment having a chip rate of 500-Mcps and a 2.2-ms measurement period.

As discussed herein, the synchronization between the frequency sources of the TX and RX devices of a channel measurement system can be important for both short-term coherent acquisition and long-term drift. Sliding correlator exemplary embodiments can be configured to trigger acquisition by the rising edge of a correlated I or Q voltage channel. This can solve the coherent acquisition problem (in a relatively static environment), but only allows for relative time or excess delay PDPs to be recorded. In order to effectively record true time-of-flight and absolute time delay PDPs, absolute timing synchronization between the TX and RX trigger signals is necessary.

Figure 9A:
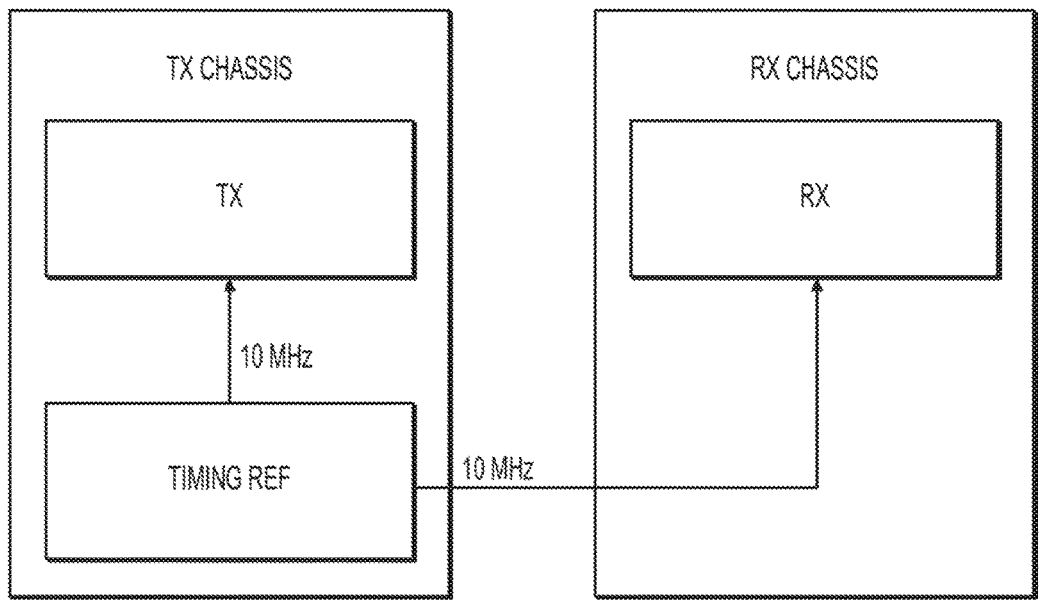
FIGS. 9(a) and 9(b) are high-level block diagrams of exemplary configurations of timing references for the TX and RX devices of the exemplary channel measurement system, according to one or more exemplary embodiments of the present disclosure.

For sounding of relatively short-range channels, e.g., indoor, a common timing reference signal can be applied to both the TX and RX devices of the channel measurement system. As illustrated in FIG. 9(a), a 10-MHz signal from a single PRS-10 Rb reference can be shared between the TX and RX devices, thereby achieving frequency and time synchronization if cable delays are carefully managed or if a manually adjustable trigger timing is available to combat unequal delays, as discussed above. The solid line between TX and RX in FIG. 9(a) is intended to illustrate that the 10-MHz frequency reference remains connected during operation of the exemplary embodiment. Although FIG. 9(a) shows the common frequency reference housed by the TX chassis, the skilled person will readily comprehend that the common frequency reference could be housed by the RX chassis with the 10-MHz signal flowing therefrom to the TX chassis.

Figure 10:
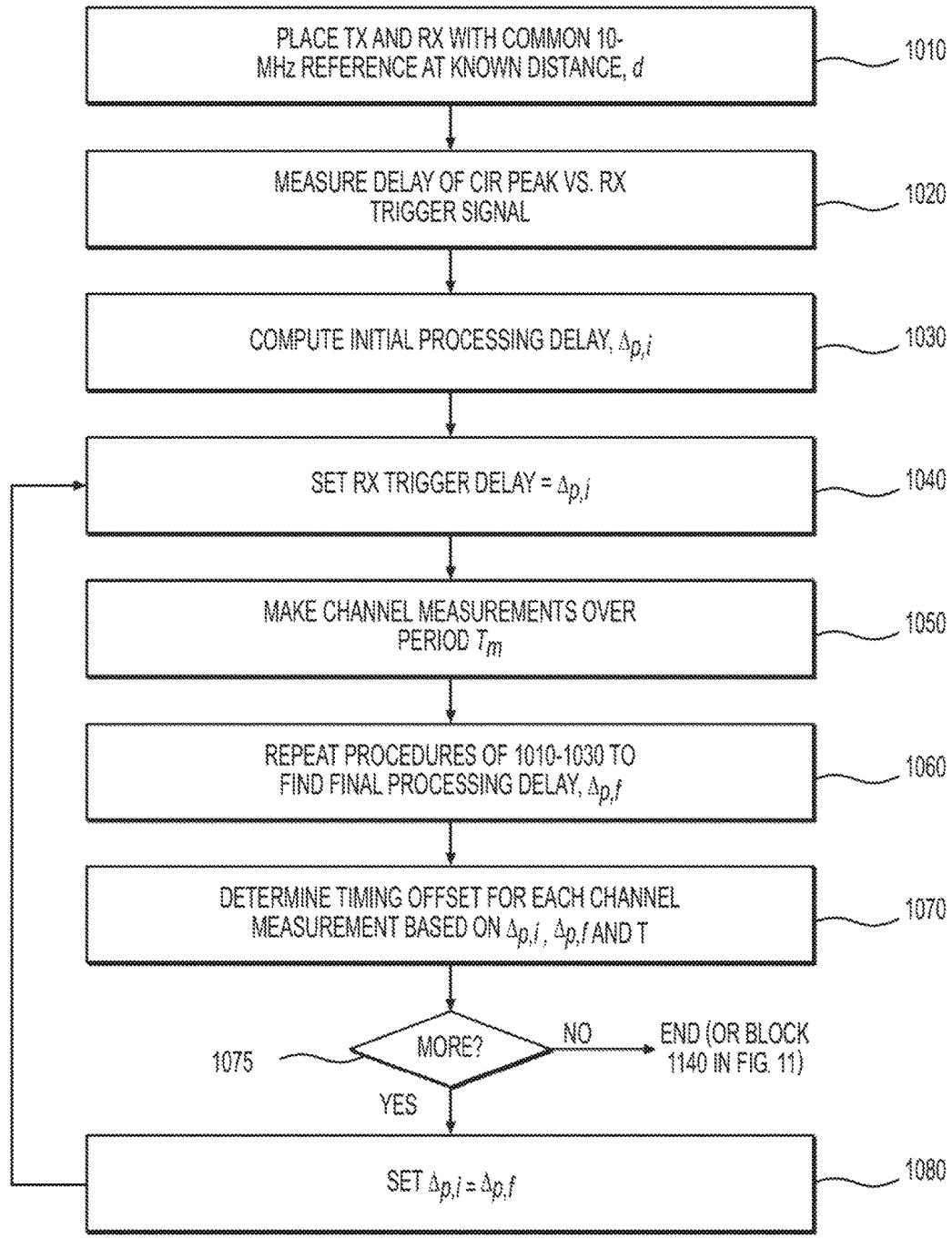
FIG. 10 is a flow diagram of an exemplary method and/or procedure for calibrating the timing offset between the TX and RX devices of the exemplary channel measurement system such as shown in FIG. 9(a), according to one or more exemplary embodiments of the present disclosure.

FIG. 10 illustrates a flow diagram of an exemplary method and/or procedure for calibrating the timing offset between the TX and RX devices sharing a single frequency reference according to an exemplary embodiment of the present disclosure, such as the exemplary channel measurement system shown in FIG. 9(a). This exemplary method and/or procedure can be used for short-distance channel measurements, both indoors and outdoors, where the TX and RX devices can remain connected to the common frequency reference. Although the exemplary method and/or procedure is illustrated in FIG. 10 by blocks in a particular order, this order is exemplary and the functions corresponding to the blocks may be performed in different orders and may be combined and/or divided into blocks having different functionality than shown in FIG. 10.

For example, beginning at block 1010, the TX and RX devices (with the connected 10-MHz reference, as discussed above) are placed with a line-of-sight (LOS) having a known distance, d, between the TX and RX antennas. In block 1020, the TX and RX devices are operated at such distance d to measure the timing and/or delay of the LOS CIR or PDP peak versus the RX trigger signal, as discussed above and shown, e.g., in FIG. 5. In block 1030, an initial processing delay, $\Delta p,i$, is computed based on the difference between the measured delay and the free-space propagation delay over known distance d. In block 1040, the RX trigger delay is set to the initial processing delay, $\Delta_{p,i}$. In block 1050, one or more channel measurements are made over a measurement period $T_m$, which may be determined based on the stability (e.g., predictability of the rate-of-change) of the common 10-MHz reference signal. In some embodiments, for example, $T_m$ can be as long as six (6) hours if the reference signal drift is relatively linear. Over this period, the PDP may shift in time up to 0.5-1 ns, which can be due to oscillator thermal drift and other random oscillator fluctuations and perturbations.

Each of the channel measurements can be made at a known time $t_i$ during measurement period $T_m$. In block 1060, after stopping channel measurements, the procedures of blocks 1010-1030 are repeated to determine a final processing delay, $\Delta_{p,f}$. In block 1070, the timing offset for each of the channel measurements is computed based on $\Delta_{p,i}$, $\Delta_{p,f}$, $t_i$, and $T_m$. For example, if the timing drift during the measurement period is modelled as being linear, then the timing offset for a measurement made at $t_i$ can be computed as $t_i \cdot (\Delta_{p,f} - \Delta_{p,i})/T_m$. In other embodiments, timing offsets can be computed in a similar manner based on piecewise-linear, quadratic, cubic, etc. models of timing drift. Once the timing offsets for each of the measurements is computed, they can be applied to correct the phase of the measurements during post-processing.

If it is determined in block 1075 that additional measurement periods are desired, then in block 1080 the initial processing delay, $\Delta_{p,i}$, is set to the measured final processing delay, $\Delta_{p,f}$. The exemplary method and/or procedure then returns to block 1040, where the various blocks described above are repeated. On the other hand, if no additional measurement period are desired, then the exemplary method exits from block 1075. As described below, in some exemplary embodiments, exiting block 1075 can be followed by the operations of block 1140 in FIG. 11.

Although the procedures of FIG. 10 are described above with relation to calibration of (and measurement by) a single pair of TX and RX devices comprising a channel measurement system, the skilled person will readily comprehend that such calibration and measurement procedures can also be performed by a channel measurement system comprising a plurality of TX devices and/or a plurality of RX devices. In some exemplary embodiments, for example, the procedures shown in FIG. 10 can be performed in parallel for each TX-RX device pair. In other exemplary embodiments, one or more of the procedures shown in FIG. 10 can be performed sequentially for the respective TX-RX device pairs.

Although the exemplary method and/or procedure shown in FIG. 10 can be effective for many scenarios, even in indoor environments it is not always possible to maintain a cable connection between TX and RX for the duration of the measurements. For sounding longer-range outdoor channels where devices are separated by more significant distances, Global Positioning System (GPS) receivers that derive highly-accurate timing references from signals broadcast by satellites can often be used to provide a common timing reference to each device in these situations. Nevertheless, GPS is rarely available in severely shadowed or obstructed environments such as urban canyons. Given that urban canyons and propagation environments that obstruct GPS are often the channels for which sounding is most needed, another solution is required for synchronizing the TX and RX devices of a channel measurement system that are unable to remain connected to a common frequency reference during measurement periods.

Figure 9B:
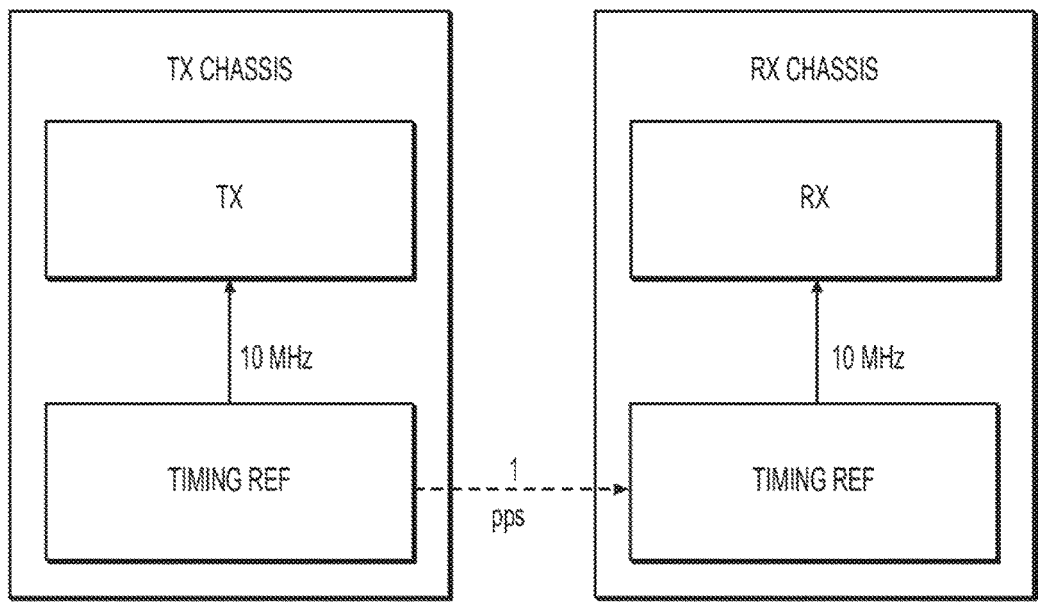
Figure 11:
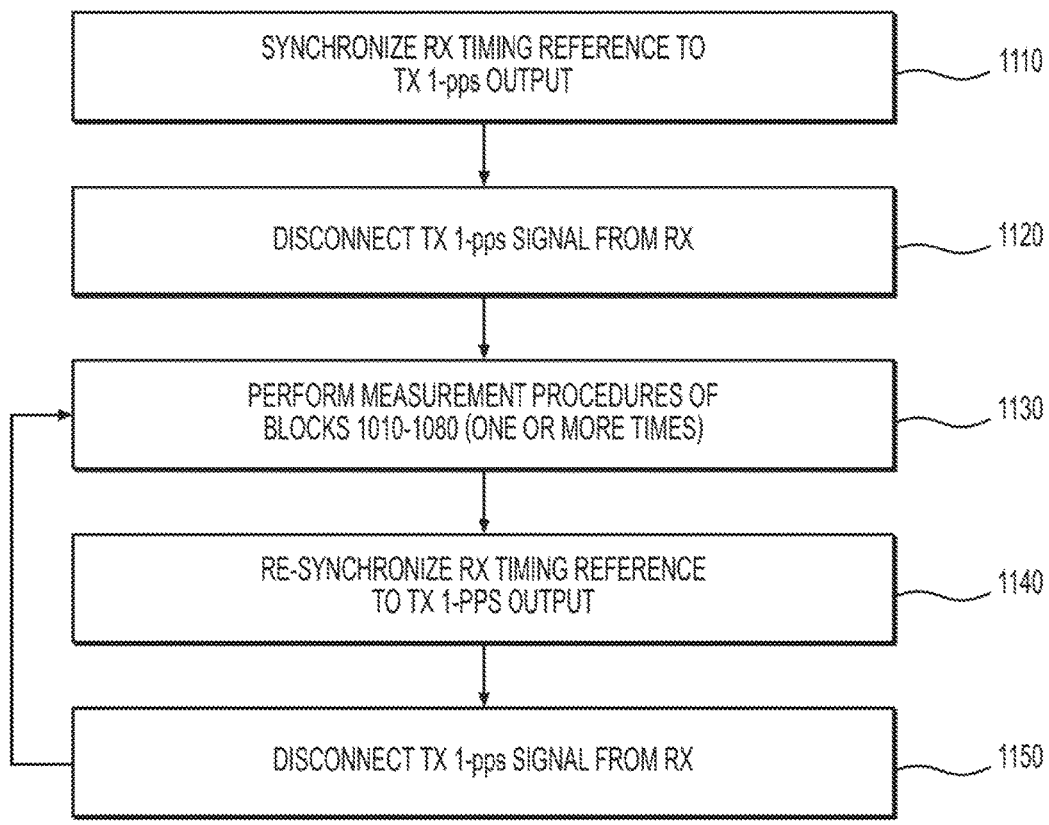
FIG. 11 is a flow diagram of an exemplary method and/or procedure for calibrating the timing offset between the TX and RX devices of the exemplary channel measurement system such as shown in FIG. 9(b), according to one or more exemplary embodiments of the present disclosure.

FIG. 11 illustrates a flow diagram of an exemplary method and/or procedure for calibrating the timing offset between the TX and RX devices having independent frequency references, such as the exemplary channel measurement system shown in FIG. 9(b). This exemplary method and/or procedure of FIG. 11 can be used for indoor and outdoor channel measurements where the TX and RX devices cannot remain connected to the common frequency reference. Although the exemplary method and/or procedure is illustrated in FIG. 11 by blocks in a particular order, this order is exemplary and the functions corresponding to the blocks may be performed in different orders and may be combined and/or divided into blocks having different functionality than shown in FIG. 11.

For example, beginning in block 1110, an output signal from the TX device's timing reference is connected to a corresponding input of the RX device's timing reference. For example, a one-pulse-per-second (1-pps) output signal from the TX device's PRS-10 can be connected to a 1-pps input port on the RX device's PRS-10. The 1-pps connection can be maintained between the two devices until the RX timing reference is substantially synchronized to the TX device. Consequently, the RX device's 10-MHz frequency source will be substantially synchronized to the TX device's 10-MHz frequency source. In some exemplary embodiments, the block 1110 procedure can require 1-2 hours. In some exemplary embodiments, the block 1110 procedure can be performed while a low-noise power supply (e.g., a UPS) is connected to both the TX and RX devices.

Figure 12:
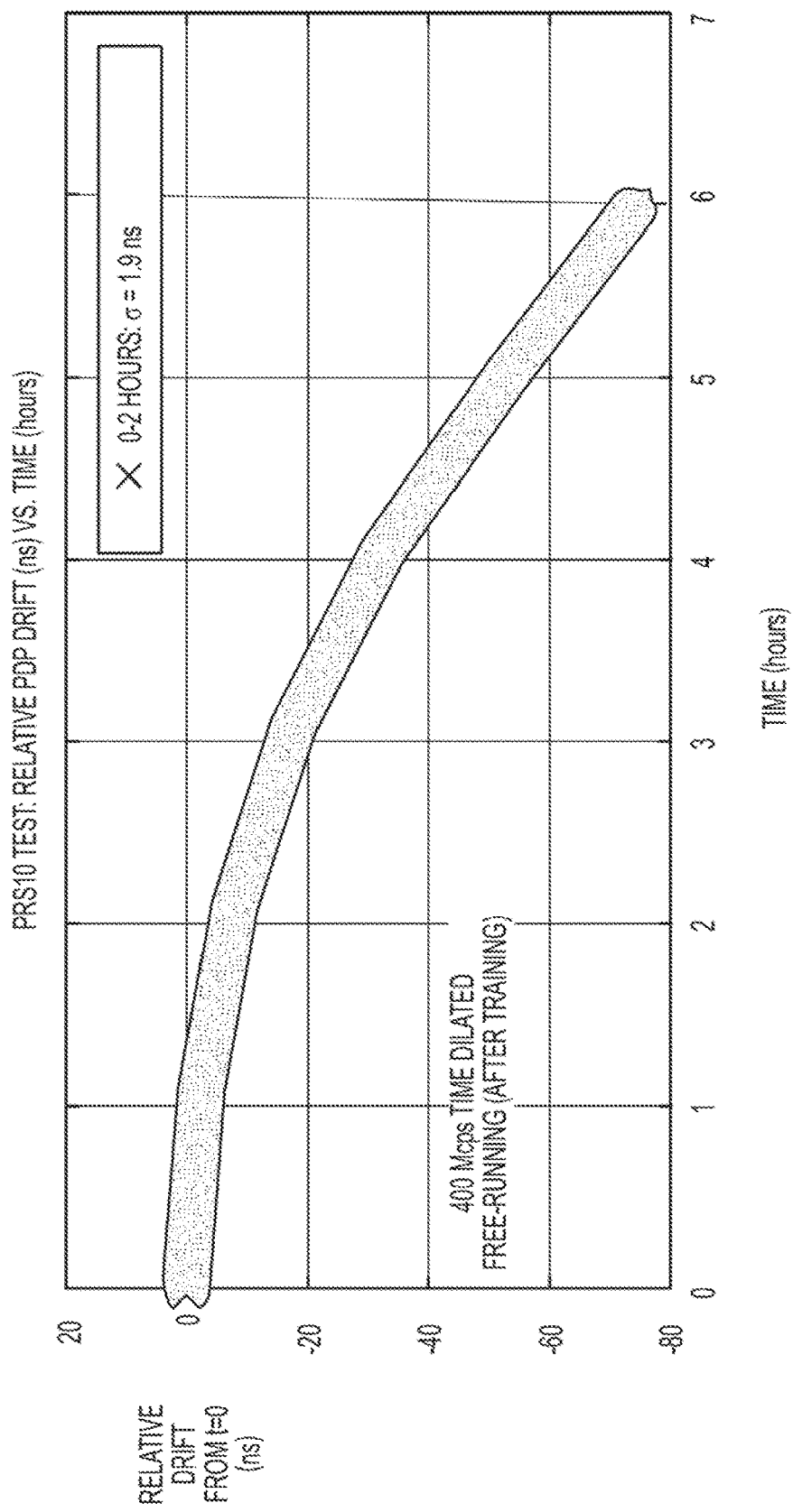
FIG. 12 is a graph of the timing drift (ns) of a calibrated, free-running frequency source comprising an exemplary channel measurement system, according to one or more exemplary embodiments of the present disclosure.

In block 1120, the 1-pps signal is disconnected and the two devices begin to "free run" and drift apart very slowly. In some exemplary embodiments, the 1-pps signal can be disconnected after an indicator on the RX device's PRS-10 indicates substantial synchronization. In block 1130, the short-term-drift calibration and channel measurement procedures of blocks 1010-1080 shown in FIG. 10 are performed one or more times. Unlike described above, however, these procedures are performed with both the TX and the RX devices' frequency sources free-running (e.g., not connected). FIG. 12 illustrates an exemplary timing drift between TX and RX frequency sources versus duration of time after they were disconnected in block 1120. As shown in FIG. 12, this drift can be relatively linear for 1-2 hours and sometimes up to 3 hours with a root mean square error (RMSE) of about 2 to 2.5 ns about the mean line of the PDP drift. Accordingly, in this example, channel measurements can be performed for a period of approximately two hours. After completing the procedures of blocks 1010-1080 (e.g., exiting "no" from block 1075 to block 1140), the 1-pps output signal from the TX device can be reconnected to the corresponding input port on the RX device. The 1-pps connection can be maintained between the two devices until the RX timing reference is re-synchronized to the TX device. In some exemplary embodiments, the operation of block 1140 can require between 30 minutes and two hours before obtaining substantial re-synchronization. Subsequently, in block 1150, the 1-pps signal is disconnected and the exemplary method and/or procedure returns to block 1130 in which further measurements can be performed.

Although the procedures of FIG. 11 are described above with relation to calibration of (and measurement by) a single pair of TX and RX devices comprising a channel measurement system, the skilled person will readily comprehend that such calibration and measurement procedures can also be performed by a channel measurement system comprising a plurality of TX devices and/or a plurality of RX devices. In some exemplary embodiments, for example, the procedures shown in FIG. 11 can be performed in parallel for each TX-RX device pair. In other exemplary embodiments, one or more of the procedures shown in FIG. 11 can be performed sequentially for the respective TX-RX device pairs.

Although various embodiments are described herein above as a combination of processing blocks, the person of ordinary skill will readily comprehend that such processing blocks can be embodied by various combinations of hardware and software in various systems, computing devices, control devices, apparatuses, non-transitory computer-readable media, etc. Moreover, as described herein, a device or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus can be regarded as a device or apparatus, or as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and numbered paragraphs thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. Further, all publications and patent applications referred to herein above are also incorporated herein in their entireties.

What is claimed is:

1. A system for measuring a parameter of a millimeter wave (mmW) channel, comprising:
 a receiver (RX) device configured to:
  a. receive a first signal from the mmW channel,
  b. generate a second signal, and
  c. measure the channel parameter based on a comparison between the first and second signals; and
 a controller configured to:
  a. determine a first calibration of the system before measuring a channel impulse response (CIR);
  b. determine a second calibration of the system after measuring the CIR; and
  c. determine a correction for the channel parameter measurement based on the first and second calibrations.

2. The system of claim 1, wherein:
 the first calibration comprises a first transmit-receive (TX-RX) delay;
 the second calibration comprises a second TX-RX delay; and
 the correction comprises a phase correction.

3. The system of claim 1, wherein:
 the RX device is further configured to perform a plurality of channel parameter measurements after the first calibration and before the second calibration; and
 the controller is further configured to determine a correction for each of the plurality of channel measurements based on the first and second calibrations.

4. The system of claim 1, further comprising a transmitter (TX) device comprising a TX frequency source.

5. The system of claim 3, wherein the first signal comprises a first pseudorandom noise (PN) code and the second signal comprises a second PN code.

6. The system of claim 5, wherein the RX device is further configured to:
 generate the second PN code at different rate than the rate of the first PN code; and
 measure the channel parameter based on a sliding correlator.

7. The system of claim 5, wherein the RX device is further configured to measure the channel parameter based on a wideband correlator.

8. The system of claim 5, wherein the RX device further comprises an RF downconverter configured to convert the received signal into a baseband signal for comparison with the second PN code.

9. The system of claim 4, wherein the TX device is configured to, based on the TX frequency source, generate a first PN code, upconvert the first PN code to a radio-frequency (RF) signal, and transmit the RF signal into the mmW channel.

10. The system of claim 4, wherein the RX device is further configured to receive the first signal from the mmW channel, and generate the second signal based on the TX frequency source.

11. The system of claim 4, wherein:
the RX device further comprises an RX frequency source;
the RX device is further configured to receive the first signal from the mmW channel and generate the second signal based on the RX frequency source; and
the TX and RX frequency sources are connected during the determination of the first and second calibrations; and
the TX and RX frequency sources are disconnected during the channel parameter measurements.

12. The system of claim 3, wherein the controller is further configured to estimate a power delay profile (PDP) of the mmW channel based on the plurality of channel parameter measurements and the plurality of corrections.

13. The system of claim 3, wherein the plurality of channel parameter measurements comprises measurements of at least one of: (a) a plurality of TX/RX angular orientation sets $\{\theta r_w, \varphi r_x, \theta t_y, \varphi t_z\}$; (b) a plurality of TX/RX location pairs $\{i, j\}$; or (c) a plurality of TX/RX antenna pairs.

14. The system of claim 1, wherein the channel parameter comprises at least one of a channel impulse response (CIR) and a power delay profile (PDP).

15. A method for measuring a parameter of a millimeter wave (mmW) channel in a system, comprising:
receiving a first signal from the mmW channel; generating a second signal;
measuring the channel parameter based on a comparison between the first and second signals;
determining a first calibration of the system before measuring the channel parameter;
determining a second calibration of the system after measuring the channel parameter; and
determining a correction for the channel parameter measurement based on the first and second calibrations;
wherein the channel parameter comprises at least one of a channel impulse response (CIR) and a power delay profile (PDP).

* * * * *